Aug. 30, 1955 W. H. ZINN 2,716,705
RADIATION SHIELD

Filed March 27, 1945 2 Sheets-Sheet 1

Witnesses:
Hubert E. Metcalf
Paul A. Glaister

Inventor:
Walter H. Zinn,
By: Robert A. Lavender
Attorney.

Aug. 30, 1955  W. H. ZINN  2,716,705
RADIATION SHIELD
Filed March 27, 1945  2 Sheets-Sheet 2
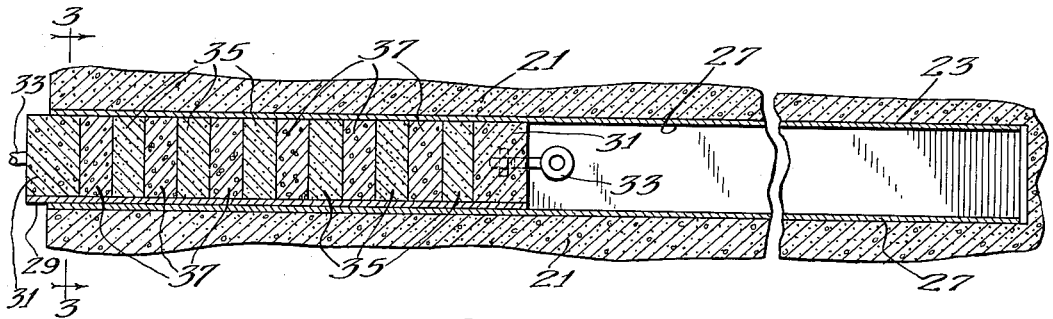
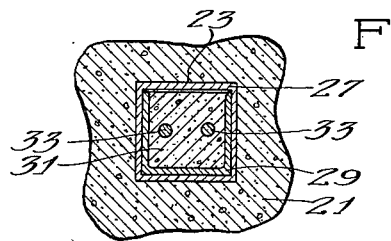
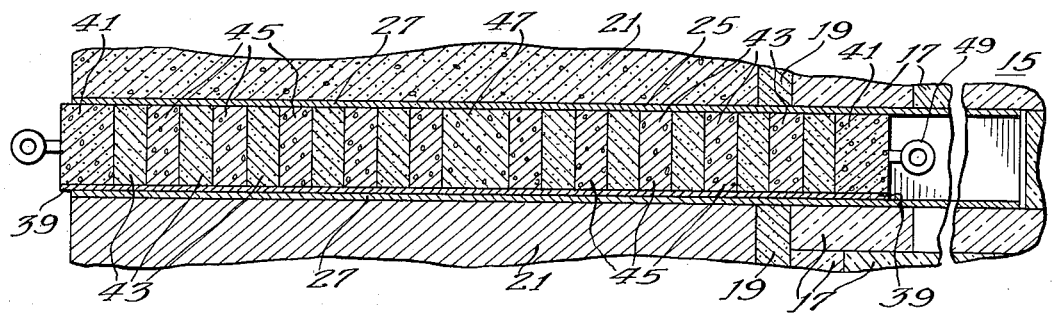
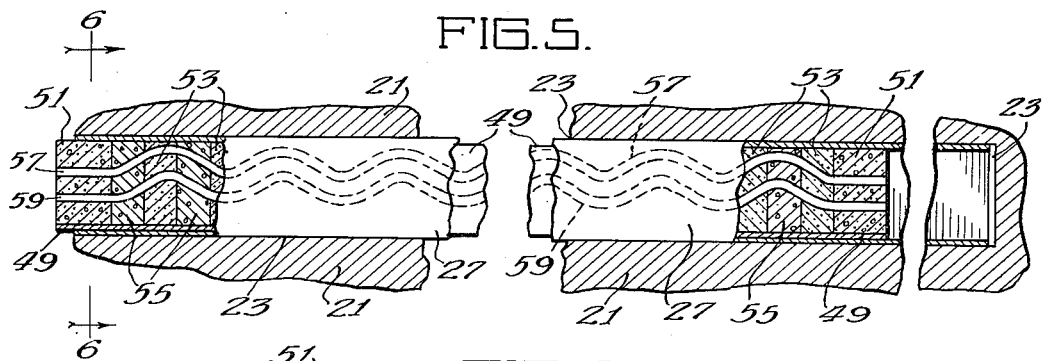
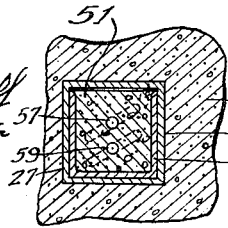
Inventor:
Walter H. Zinn

United States Patent Office 2,716,705
Patented Aug. 30, 1955

2,716,705

RADIATION SHIELD

Walter H. Zinn, Chicago, Ill., assignor to the United States of America as represented by the United States Atomic Energy Commission Application March 27, 1945, Serial No. 585,158

3 Claims. (Cl. 250—108)

The present invention relates broadly to neutronic reactor and is particularly concerned with shields adapted to protect personnel from the various types of radiation developed during the operation of such devices.

The usual neutronic reactor comprises a neutron fissionable composition undergoing a self-sustaining neutron chain reaction or other composition containing a fissionable isotope such as $U^{235}$, $U^{233}$ or $94^{239}$ and generally comprises bodies of material, such as uranium metal disposed in a suitable moderating substance such as carbon, heavy water, oxygen, or beryllium. The moderating material has the function of slowing down the fast neutrons released as an incident to the fission process, thereby making available thermal or low energy neutrons which are capable of producing further fissions, and thus continuing the chain reaction. A detailed description of such reactors appears in an application of Enrico Fermi and Leo Szilard, Serial No. 568,904, filed December 19, 1944, now Patent 2,708,656, issued May 17, 1955.

During the operation of a neutronic reactor relatively high neutron densities are necessarily present in the lattice or reacting portion of the reactor. As a result, considerable quantities of both slow and fast neutrons tend to pass out of the reacting portion, and in the absence of shields these neutrons would irradiate personnel and materials present in the region of the reactor. Such irradiation is very undesirable not only because it is immediately dangerous to operating personnel, but because of the possibility of producing radioactive products in the surrounding area. Accordingly it is considered almost imperative that neutronic reactors shall be surrounded with shields which are effective to reduce neutron densities in the region of the reactor to safe values. A particularly satisfactory type of shield for this purpose comprises a wall of concrete several feet in thickness disposed about the reacting portion of the reactor.

While these massive concrete shields are very effective and reduce neutron densities to safe values in the immediate vicinity of the reactor, it is necessary for control and investigation purposes to move instruments and various materials into the reactor, sometimes merely into proximity with the reaction portion, but at other times into and through the reacting portion. To take care of this requirement, access ducts or passageways are usually provided in the shield structure. These access ducts may be of any convenient size or shape; they are preferably formed when the concrete shield is being cast; and they may extend either to the edge of the central reacting portion of the reactor, or into, and sometimes through that portion.

It will be immediately apparent that these access ducts constitute unshielded passageways extending from outside the reactor through the reactor shield to the reacting portion of the reactor. As a result, they provide paths through which neutrons and other radiations may move substantially unimpeded from the reacting portion of the reactor out through the passageway. In effect, a beam of neutrons would be projected through these passageways at all times when the reactor was in operation. This obviously would be extremely dangerous to personnel both because of immediate biological effect and because of the possibility of producing radioactive products capable of future continuing injury.

The present invention is concerned particularly with the provision of a suitable protective shield which is particularly useful as a closure plug for use in closing these ducts or passageways provided in the main shield structure used in connection with neutronic reactors but which may be used generally as a radiation shield. Such shield may comprise neutron shielding material and gamma shielding composition. Such shield may be of multilayered construction comprising one or more layers of a neutron absorbing or shielding material and one or more layers of a gamma and neutron shielding material.

It is also an object of my invention to provide a shield or closure plug which can be easily manufactured, which can be readily put into place and removed, and which will not occupy an unreasonable length of the passageway when in use.

These and other objects and the various novel features and advantages of my invention will be made more apparent in the accompanying drawings and the following description of certain preferred embodiments thereof. In the drawings, Fig. 1 is a diagrammatic, transverse, sectional view through a neutronic reactor and shield structure provided with access passageways of two different types;

Fig. 2 is an enlarged sectional view on the general line 2—2 of Fig. 1;

Fig. 3 is a sectional view on the line 3—3 of Fig. 2;

Fig. 4 is an enlarged sectional view, taken on the line 4—4 of Fig. 1 and illustrates a modified form of of the shield plug of our invention;

Fig. 5 is a sectional view similar to Figs. 2 and 4, partially in elevation, of a second modified form of the invention; and Fig. 6 is a sectional view on the line 6—6 of Fig. 5.

Figure 1:
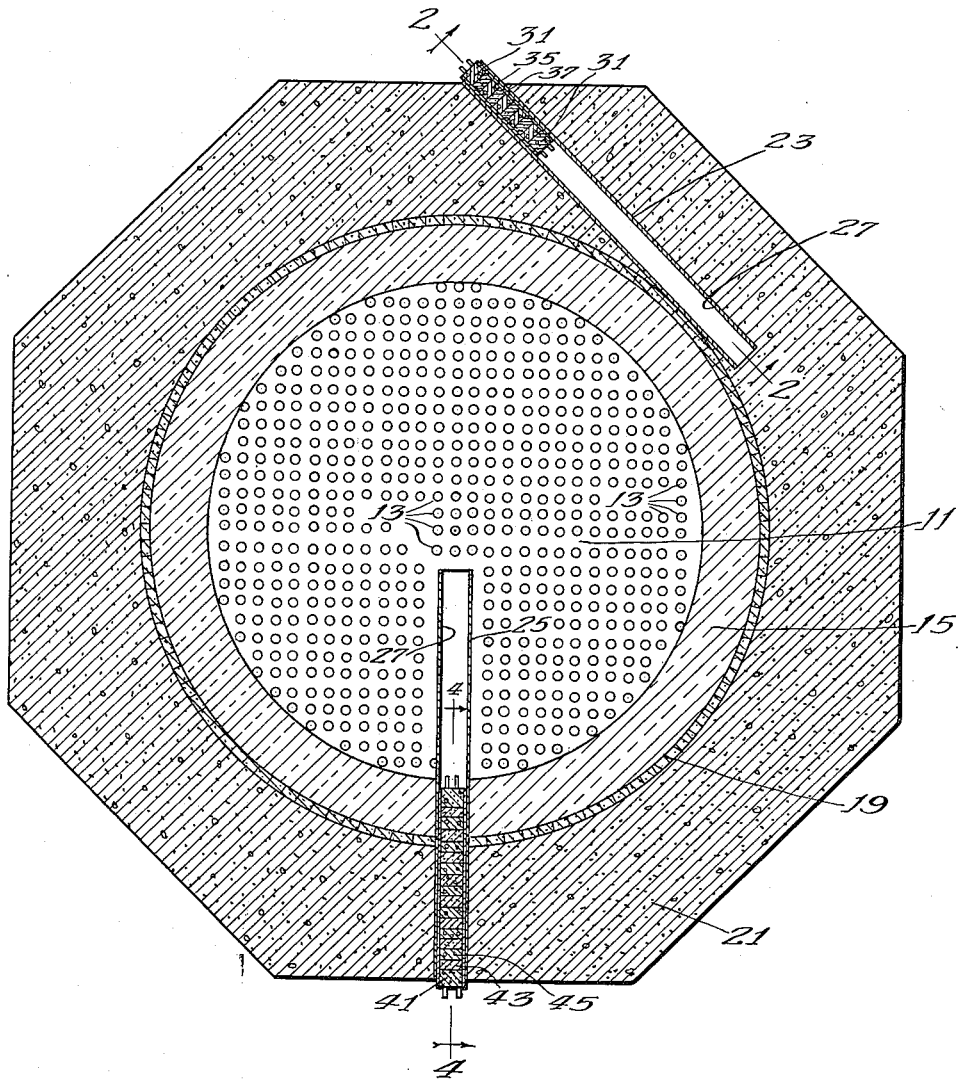

The neutronic reactor illustrated in Fig. 1 comprises generally a central reacting portion 11, which may be cylindrical in form, and which comprises a plurality of bodies 13 of chain reacting material, such as uranium metal, arranged in a symmetrical, spatial lattice. The space between the bodies 13 of reacting materials is occupied by a suitable moderating substance which may comprise blocks of graphitic carbon, beryllium, heavy water, etc. A neutron reflecting shield 15 comprising blocks 17 (Fig. 4) of graphitic carbon is disposed about the central reacting portion 11 of the reactor. This shield 15 serves the purpose of reflecting substantial quantities of neutrons which would otherwise be lost back into the reacting portion of the reactor. An inner radiation shield 19 of material having high neutron absorbing characteristics, such as a lead-cadmium alloy is disposed about the reflector shield 15, and serves in effect, as a lining for the main outer shield 21 which is of monolithic, cast concrete construction, several feet thick.

In the particular device illustrated in the drawings, the main outer shield 21 is provided with two access ducts or passageways 23 and 25, each of which is rectangular in cross-sectional outline, is about 12 inches square, and is lined by a thin steel tube sheet 27. The passageway 23 extends tangentially to the cylindrical reacting portion 11 of the reactor, and the other passageway 25 extends radially inwardly to approximately the center of the reacting portion 11. Both of the passageways 23 and 25 are axially straight. It will be understood that the shape and direction of these particular access passageways are merely illustrative, and that passageways of other shapes and in other locations may not only be satisfactory but may be desired in certain instances.

The removable shields or closure plugs provided for closing the access passageways 23 and 25 are illustrated more particularly in Figs. 2 to 6. To accomplish the desired object of protecting the reactor operating personnel, these closure plugs must effectively shield out not only neutron radiation but also beta and gamma radiations, and the problem is further complicated, because neutron irradiation of neutron shielding materials normally gives rise to secondary gamma or beta radiation. After considerable investigation, I have discovered that a satisfactory and effective shield can be made by interspacing blocks or layers of a neutron absorber for fast and slow neutrons such as paraffin or other hydrogenous neutron absorber, with blocks or layers of a neutron absorber and another material which is a gamma and beta absorber which may be a mixture of paraffin and small metal particles, such as steel shot. The paraffin layers are effective as neutron absorbers, and the interspaced layers of the paraffin-metal particle mixture constitute equally effective absorbers of gamma and beta radiations resulting from the neutron irradiation of the paraffin or from some other source within the reactor.

For convenience in handling, it is almost essential that the closure plug shall constitute a mechanically strong device. Paraffin and paraffin-shot mixtures alone are mechanically weak, and it has been found highly desirable to utilize an auxiliary support for these blocks or layers of radiation absorbing material. Conveniently, the support may comprise a suitable steel shape within which the radiation absorbing layers are cast or otherwise formed. In the particular closure plug illustrated in Figs. 2 and 3, the support comprises a length of steel channel 29, about thirty inches long, substantially rectangular in outline, and with its overall external dimensions just slightly less than the corresponding internal dimensions of the lining 27 of the access passageway 23 which the plug is designed to occupy. Each end of the channel 29 is closed by rectangularly shaped concrete blocks 31, which may be cast in place by locating a suitable partition in and at the ends of the channel. If desired, hook eyes 33 or other handling members may be cast into the end blocks 31 for facilitating the lifting of the closure plug and the moving of the plug into and out of the access opening. Alternately interspaced in the space between the two end blocks 31, there are blocks or layers 35 of paraffin and blocks or layers 37 of paraffin mixed with metallic particles such as small shot in sufficient amounts that the paraffin merely fills the space between the metal particles. These layers or blocks 35 and 37 may be formed separately and put in place, or they may be cast directly into the channel support 29, layer by layer, by the use of suitable temporary partitions.

The closure plug or shield resulting from this construction has been found by actual test to be a highly efficient protective device. The paraffin blocks or layers 35 are effective absorbers of neutron radiation, and the interspersed blocks or layers 37 of the paraffin-metal particle mixture are equally effective absorbers of gamma and beta radiation resulting from the neutron radiation of the paraffin layers 35, or from other causes. The concrete end blocks 31 are effective shields against both types of radiation, and while these end blocks are provided primarily from structural considerations, they contribute substantially to the satisfactory shielding action of the closure plug.

The closure plug construction illustrated in Fig. 4 is substantially similar to the above described embodiment except, that the plug is considerably longer (about 54 inches) and hence capable of somewhat more complete shielding than the shorter embodiment. A closure plug of this type might be desired for closing an access passageway such as the passageway 25 leading to the interior of the reacting portion 11 of the reactor, in which region very high neutron densities will be encountered. The particular elongated type closure plug illustrated in Fig. 4 utilizes a channel shaped metallic support 39, similar to the previously described embodiment, and the ends of this support are closed by concrete blocks 41 similar to the blocks 31. Also, there are alternate layers or blocks 43 of paraffin and layers or blocks 45 or paraffin-metallic shot mixtures disposed intermediate the end closure blocks 41. With these relatively long closure plugs, it has been found advantageous to provide one or more concrete blocks intermediate the two ends of the plug, and one such block is illustrated at 47 in Fig. 4. Hook eyes 49, similar to the hook eyes 33, may be cast into the end blocks 41 to facilitate handling of the closure plug.

Since the access passageways through the main reactor shield 21 are frequently utilized as a means for introducing instruments into the reactor, it often becomes necessary to conduct control leads or even cables for operating mechanical devices into the reactor. In such instances, it has been found practical to utilize a closure plug or shield, such as is shown in Figs. 5 and 6. This plug is similar to the construction illustrated in Figs. 2 and 3, and it could be similar to the construction illustrated in Fig. 4. The main support is a channel shaped, steel member 49 closed at its ends by suitable concrete blocks 51, and layers or blocks 53 of paraffin and layers or blocks 55 of paraffin-metallic particle mixtures are interspaced between the end blocks 51. To permit electrical conducting cables or mechanical operating cables to be led to the interior of the access passageway from outside the shield 21, while the closure plug is in place, the constituent layers of the plug are provided with cooperating aligned passageways which define two tortuous ducts or passageways 57 and 59 extending entirely through the closure plug. These tortuous passageways may be of any convenient shape, such as helical or simply undulating in a single plane, as illustrated; the important feature is to prevent the creation of a straight line passageway through the closure plug which might permit the egress of neutrons or other undesired radiations. Moreover any convenient number of passageways may be provided.

In the foregoing I have set forth the basic principles governing the design of an improved shield or closure plug, particularly adapted for use in closing the access ducts or passageways normally provided in the main shields of neutronic reactors. I have also described certain specific embodiments of my invention. The closure plug of my invention is simple in design, it is easy and inexpensive to build, and at the same time it is highly effective in accomplishing its desired purpose. Moreover, when desired electrical cables and mechanical connections can be led through the closure plug to co-act with apparatus located in the interior of the access passageway without impairment of the shielding function.

The shield herein described is not limited to the particular type of neutron and gamma and neutron shielding materials capable of absorbing intense radiations of this type to an effective degree may be used in lieu thereof as will be apparent to those skilled in the art. Moreover while the shield is particularly adapted to use as a closure it is not limited to such use and may be used for other purposes where shielding is required. Although the present invention has been described with reference to specific details of certain embodiments thereof it is not intended that such details shall be regarded as limitations upon the scope of the invention except insofar as included in the accompanying claims.

The following is claimed:

1. A radiation shield comprising a pair of spaced layers of concrete, a plurality of spaced layers of paraffin disposed between the layers of concrete, and a layer of paraffin intermixed with steel shot disposed between each of the layers of paraffin.

2. A radiation shield comprising a pair of spaced layers of concrete, a plurality of spaced layers of paraffin disposed between the layers of concrete, and a plurality of layers of paraffin intermixed with steel shot disposed between the layers of paraffin so as to separate each paraffin layer from the adjacent paraffin layers on both sides.

3. The radiation shield specified in claim 2 and further comprising a third layer of concrete disposed intermediate the ends of the shield between two adjacent layers of paraffin intermixed with steel shot.

References Cited in the file of this patent

UNITED STATES PATENTS

| Number | Name | Date |
|---|---|---|
| 1,780,107 | Barry | Oct. 28, 1930 |
| 1,815,921 | Lapof | July 28, 1931 |
| 1,968,269 | Swenson | July 31, 1934 |
| 2,175,671 | Ryan | Oct. 10, 1939 |
| 2,206,634 | Fermi et al. | July 2, 1940 |
| 2,218,679 | Hubbell | Oct. 22, 1940 |
| 2,328,105 | Strobino | Aug. 13, 1943 |
| 2,367,296 | Lutz | Jan. 16, 1945 |
| 2,462,270 | Lipson | Feb. 22, 1949 |
| 2,504,211 | Means | Apr. 18, 1950 |

FOREIGN PATENTS

| Number | Country | Date |
|---|---|---|
| 24,618 | Great Britain | of 1904 |
| 460,591 | Great Britain | Feb. 1, 1937 |
| 114,150 | Australia | May 2, 1940 |
| 861,390 | France | Feb. 7, 1941 |
| 233,011 | Switzerland | Oct. 4, 1944 |

OTHER REFERENCES

Pollard et al.: "Applied Nuclear Physics," pages 129–132, John Wiley & Sons, Inc. (1942). Copy in Patent Office Library.